United States Patent [19]

Ohike

[11] Patent Number: 5,304,785
[45] Date of Patent: Apr. 19, 1994

[54] COMBINATION INSTRUMENT FOR VEHICLE

[75] Inventor: Yukio Ohike, Shizuoka, Japan

[73] Assignee: Yazaki Corporation, Tokyo, Japan

[21] Appl. No.: 782,554

[22] Filed: Oct. 25, 1991

[30] Foreign Application Priority Data

Nov. 2, 1990 [JP] Japan .............................. 2-114714[U]
Nov. 2, 1990 [JP] Japan .............................. 2-114715[U]

[51] Int. Cl.$^5$ ............................................. G01C 22/00
[52] U.S. Cl. ..................... 235/95 R; 235/96; 235/97
[58] Field of Search .................. 235/95 R, 97, 144 R, 235/133 R

[56] References Cited

U.S. PATENT DOCUMENTS

| | | | |
|---|---|---|---|
| 3,935,996 | 2/1976 | Kleinbohl | 235/95 R |
| 3,962,986 | 6/1976 | Fujita et al. | 235/95 R |
| 4,354,097 | 10/1982 | Menager | 235/96 |
| 4,473,741 | 9/1984 | Itoh et al. | 235/144 R |

FOREIGN PATENT DOCUMENTS 2411305 9/1975 Fed. Rep. of Germany.
2196434 4/1988 United Kingdom.

*Primary Examiner*—Michael L. Gellner
*Assistant Examiner*—Eddie C. Lee
*Attorney, Agent, or Firm*—Sughrue, Mion, Zinn, Macpeak & Seas

[57] ABSTRACT

A combination meter for vehicle comprises counter device, for displaying a distance traveled by the vehicle, having a plurality of numeral wheels rotatably juxtaposed to a flame provided with the counter device; drive device for driving a pointer provided with the drive device to display a measured vehicle source by obtaining a scale of a dial secured to the frame of the counter device; coupling device, provided with the counter device and the drive device, for integrally coupling the flame of the counter device with the drive device.

12 Claims, 5 Drawing Sheets

COMBINATION INSTRUMENT FOR VEHICLE

BACKGROUND OF THE INVENTION

The present invention generally relates to an integrating distance meter for a vehicle, and more particularly to an integrating distance meter for a vehicle including an odometer counter having a plurality of numeral wheels rotatably juxtaposed to a frame and adapted to integrate and display the distance traveled by the vehicle in an unresettable manner, and a trip counter having a plurality of numeral wheels rotatably juxtaposed to a frame and adapted to integrate and display the distance traveled by the vehicle in a resettable manner. Furthermore, the present invention relates to a combination instrument for a vehicle, and more particularly to a combination instrument for a vehicle which combines an integrating distance meter having a plurality of numeral wheels rotatably juxtaposed to a frame and adapted to display the distance travel by the vehicle, and the analog counter for indicating a measured vehicle speed or the like by means of a pointer driven by an electrically-operated movement such as a cross-coil-type movement and the scale of a dial secured to a frame of the integrating distance meter.

In general, a vehicle instrument such as the one illustrated in a front elevational view in FIG. 6 is mounted in a vehicle. In the drawing, window holes 2a and 2b are respectively formed in a dial 2 of a speedometer for displaying vehicle speed in cooperation with a pointer 1, one above and the other below the pointer 1 as viewed in FIG. 6, and the distance traveled by the vehicle is integrated by an odometer counter in an unresettable manner and is displayed through the window hole 2a, while the distance traveled by the vehicle is integrated by a trip counter in a resettable manner and is displayed through the window hole 2b. The reference numeral 3 denotes a reset button for resetting the display of the distance on the trip counter.

As an integrating distance meter disposed in the rear of the dial, shown in FIG. 6, for displaying an integrated distance, one having an arrangement illustrated in a top view in FIG. 7, a side elevational view in FIG. 8, and a cross-sectional view in FIG. 9 has been used.

As shown in the drawings, the integrating distance meter for a vehicle is arranged such that two support shafts 21a and 22a are supported on a single frame 10 parallel with each other at a predetermined interval corresponding to the distance between the window holes 2a and 2b of the dial 2, and numeral wheels 21b of an odometer counter 21 are rotatably juxtaposed to one support shaft 21a, while numeral wheels 22b of a trip counter 22 are rotatably juxtaposed to the other support shaft 22a. In addition, a stepping motor 23 for driving both the numeral wheels 21b and 22a is assembled and secured to the same frame 10.

In the integrating distance meter arranged as described above, the stepping motor 23 is electrically connected to a hard printed circuit board (HPC) 24 having thereon various electronic components constituting an electrical circuit for generating a drive signal for driving the stepping motor 23. As the stepping motor 23 is driven in correspondence with the travelling of the vehicle, the odometer counter 21 and the trip counter 22 are operated so as to integrate and display the distance traveled by the vehicle.

The reference numeral 25 denotes a cross-coil-type movement having a rotating shaft 25a at a distal end of which the pointer 1 is fixed, the movement 25 being adapted to drive the pointer 1 and display the speed. This movement 25 is accommodated and fixed in a space formed in the frame 10 below the numeral wheels 21b and 22b.

FIG. 9 shows a cross-sectional view of such a combination indication instrument. FIG. 9 is a cross-sectional view taken along line A—A in FIG. 6.

In the drawing, the cross-coil-type movement 25 for driving the pointer of the speedometer in correspondence with a measured amount, as well as the odometer counter 21 and the trip counter 22 which constitute an integrating distance meter 20, are disposed below the dial 1.

The cross-coil-type movement 25 has a coil bobbin 101, a pair of coils 102 wound around the outer periphery of the coil bobbin 101 perpendicularly to each other, and a magnet rotor 104 accommodated rotatably in a cavity 103 formed in the coil bobbin 101, and the rotating shaft 105 of the magnet rotor 104 has one end projecting out of the coil bobbin 101. By virtue of this arrangement, electric current corresponding to the measured amount is allowed to flow across the pair of coils 102 so as to respectively generate magnetic fields perpendicular to each other. As a result, the magnet rotor 104 and its rotating shaft 25a are rotated in such a manner that the direction of a synthetic magnetic field obtained by synthesizing the perpendicular magnetic fields and the direction of the N, S poles of the magnet rotor 104 will agree with each other.

Meanwhile, the odometer counter 21 and the trip counter 22 are arranged such that the numeral wheels 21b and 22b are respectively fitted rotatably on the support shafts 21a and 22a supported on the common frame 10, and an upper-digit numeral wheel is driven a one-tenth revolution by one revolution of a lower-digit numeral wheel to effect carrying. The dial 1 is secured to the coon frame 10 by means of screws or the like with the dial 1 superposed on a light-transmitting plate 30.

The movement 25 arranged as described above is secured, by means of set screws serving as terminals, to the HPC 24 on which are mounted electrical components such as ICs and resistors constituting a circuit for generating a signal for causing electric current corresponding to a measured amount to flow across the pair of coils 102. As the HPC 24 to which the movement 10 is thus fixed is secured to the frame 10 by means of screws 32 or the like, the movement 25 is accommodated and fixed in a cavity 202 formed between the odometer counter 21 and the trip counter 22, thereby forming the movement 25 and the integrating distance meter 20 integrally with each other.

The rotating shaft 25a of the movement 25 fixed to the common frame 10 via the HPC 24 as described above projects through the obverse surface of the dial 2 vie holes 201a, 30a, and 2d which are respectively formed in the frame 10, the light-transmitting plate 30, and the dial 2. The pointer 1 is secured to this projecting end by pressure fitting. In addition, the numeral wheels 21b of the odometer counter 21 and the numeral wheels 22b of the trip counter 22 face the window holes 2a and 2b of the dial 2.

With the above-described conventional integrating distance meter, various problems have been encountered since the odometer counter 21 and the trip counter 22 are assembled to the single frame 10.

For instance, there are numerous kinds of trip counter 22 whose number of digits and design differ depending on the type of vehicle and the grade. For this reason, integrating distance meters for vehicles in which various trip counters 22 are selectively combined with one kind of odometer counter 21 are required.

In such a case, with the above-described conventional 111, before the specifications of the trip counter 22 are determined, it is possible to fabricate in advance a multiplicity of odometer counters 21 without the trip counter 22 assembled thereto; however, it is necessary to store unfinished integrating distance meters each having a large frame 10, which is disadvantageous in terms of space in the light of management. In addition, there is a drawback in that, at the time when components constituting a trip counter 22 which meets required specifications are fitted to the frame 10, a large unfinished product must be handled, so that the efficiency in assembling operation is aggravated.

In addition, integrating distance meters each provided with the odometer counter 21 alone are required in some cases. In such cases, however, it is necessary to newly design and manufacture special integrating distance meters, and the number of kinds of products manufactured increases, which is disadvantageous in terms of cost and management.

As described above, the movement 25 and the integrating distance meter 20 are conventionally formed integrally by fixing the HPC 24, to which the cross-coil-type movement 25 is secured, to the frame 10 common to the odometer counter 21 and the trip counter 22 which constitute the integrating distance meter.

For this reason, if variations occur both in the fixing of the movement 25 to the HPC 25 and in the fixing of the HPC 25 to the common frame 10, and if the variations overlap in such a manner as to be added together, the positioning of the movement 25 with respect to the common frame 10 becomes substantially inaccurate, so that the rotating shaft 25a of the movement 25 fails to be located at the center of a hole 1d bored in the dial 2.

If this occurs, there is problem in that the pointer 1 secured to the tip of the rotating shaft 25a becomes offset from its predetermined position on the dial, with the result that the relationship between the pointer 1 and the window holes 2a and 2b and the relationship between the pointer 1 and a scale 1a become inaccurate.

In addition, with the above-described conventional combination instrument, since an assembling method is adopted in which the HPC 24 formed integrally with the movement 25 is assembled to the already assembled integrating distance meter 20, it is necessary to handle the HPC 24 formed integrally with the movement 25. Hence, such an arrangement has not been favorable in effecting automatic assembly.

SUMMARY OF THE INVENTION

In view of the forgoing problem, an object of the present invention is to provide an integrating distance meter capable of readily coping with the variation of a trip counter.

A second object of the present invention is to provide an integrating distance meter provided with an odometer counter alone, without increasing the number of kinds of products manufactured.

A third object of the present invention is to provide a combination instrument for a vehicle which allows assembly to be effected readily with sufficient accuracy without causing a pointer to be offset substantially on a dial and which is suitable for automatic assembly.

To attain the primary object of the invention, the integrating distance meter for a vehicle in accordance with a first aspect of the invention comprises: an odometer counter having a plurality of numeral wheels rotatably juxtaposed to an odometer frame and adapted to integrate and display a distance traveled by the vehicle in an unresettable manner; a trip counter having a plurality of numeral wheels rotatably juxtaposed to a trip frame and adapted to integrate and display the distance traveled by the vehicle in a resettable manner; and coupling means for integrally coupling the odometer frame with the trip frame after positioning the frames relative to each other.

To attain the second object of the invention, the integrating distance meter for a vehicle in accordance with a second aspect of the invention may further comprise: a driving source provided in the odometer frame and adapted to drive the numeral wheels in correspondence with the traveling of the vehicle, the driving source being also adapted to drive the numeral wheels of the trip counter.

In accordance with the above-described arrangement, the odometer frame to which the numeral wheels of the odometer counter are juxtaposed and the trip frame to which the numeral wheels of the trip counter are juxtaposed can be coupled to each other by the coupling means provided on these frames after being positioned relative to each other so as to be formed as a unit. Accordingly, the odometer counter can be assembled in advance separately from the trip counter, and one of various kinds of trip counters assembled separately from the odometer counter can be later selected and coupled with the odometer counter, so as to obtain an integrating distance meter having both odometer and trip counters.

In addition, since the driving source is provided in the odometer frame for driving the numeral wheels in correspondence with the travelling of the vehicle and for driving the numeral wheels of the trip counter as well, the odometer counter separated from the trip counter itself as a single unit can constitute the integrating distance meter.

To attain the third object of the invention, the combination instrument for a vehicle according to a third aspect of the invention comprises: an integrating distance meter having a plurality of numeral wheels rotatably juxtaposed to a frame and adapted to display a distance traveled by the vehicle; and an analog counter for indicating a measured vehicle speed or the like by means of a pointer driven by an electrically-operated movement such as a cross-coil-type movement and a scale of a dial secured to a frame of the integrating distance meter, wherein the electrically-operated movement is directly assembled and secured to the frame of the integrating distance meter.

In addition, the combination instrument for a vehicle according to a fourth aspect of the invention comprises: an integrating distance meter having a plurality of numeral wheels rotatably juxtaposed to a frame and adapted to display a distance traveled by the vehicle; and an analog counter for indicating a measured vehicle speed or the like by means of a pointer driven by an electrically-operated movement such as a cross-coil-type movement and a scale of a dial secured to a frame of the integrating distance meter, wherein a fitting hole and an engaging portion are formed in the electrically-operated movement, positioning pin fitting to the fitting hole and a resilient engaging piece for engaging the engaging portion are formed in the frame of the integrating distance meter, and the electrically operated movement is directly assembled and secured to the frame of the integrating distance meter by causing the positioning pin of the integrating distance meter to be fitted to the fitting hole of the electrically-operated movement and by causing the resilient engaging piece of the integrating distance mater to engage the engaging piece of the movement.

In the above-described arrangement, since the electrically-operated movement is directly assembled and fixed to the frame of the integrating distance meter, the positioning of the electrically-operated movement with respect to the integrating distance meter can be effected accurately, and the positional relationship between the scale of the dial fixed to the frame of the integrating distance meter and the pointer driven by the electrically-operated movement is prevented from becoming offset substantially.

Moreover, the arrangement provided is such that the positioning pins of the integrating distance motor are fitted to the fitting holes in the electrically-operated movement, and the resilient engaging piece of the integrating distance meter is engaged with the engaging portion of the electrically-operated movement, so as to allow the electrically-operated movement to be directly assembled and secured to the frame of the integrating distance meter. Accordingly, the positioning of the electrically-operated movement with respect to the integrating distance meter is effected accurately, and positional relationship between the scale of the dial fixed to the frame of the integrating distance meter and the pointer driven by the electrically-operated movement is prevented from becoming offset substantially. In addition, the efficiency in assembling operation is facilitated.

DESCRIPTION OF THE PREFERRED EMBODIMENT

Figure 1:
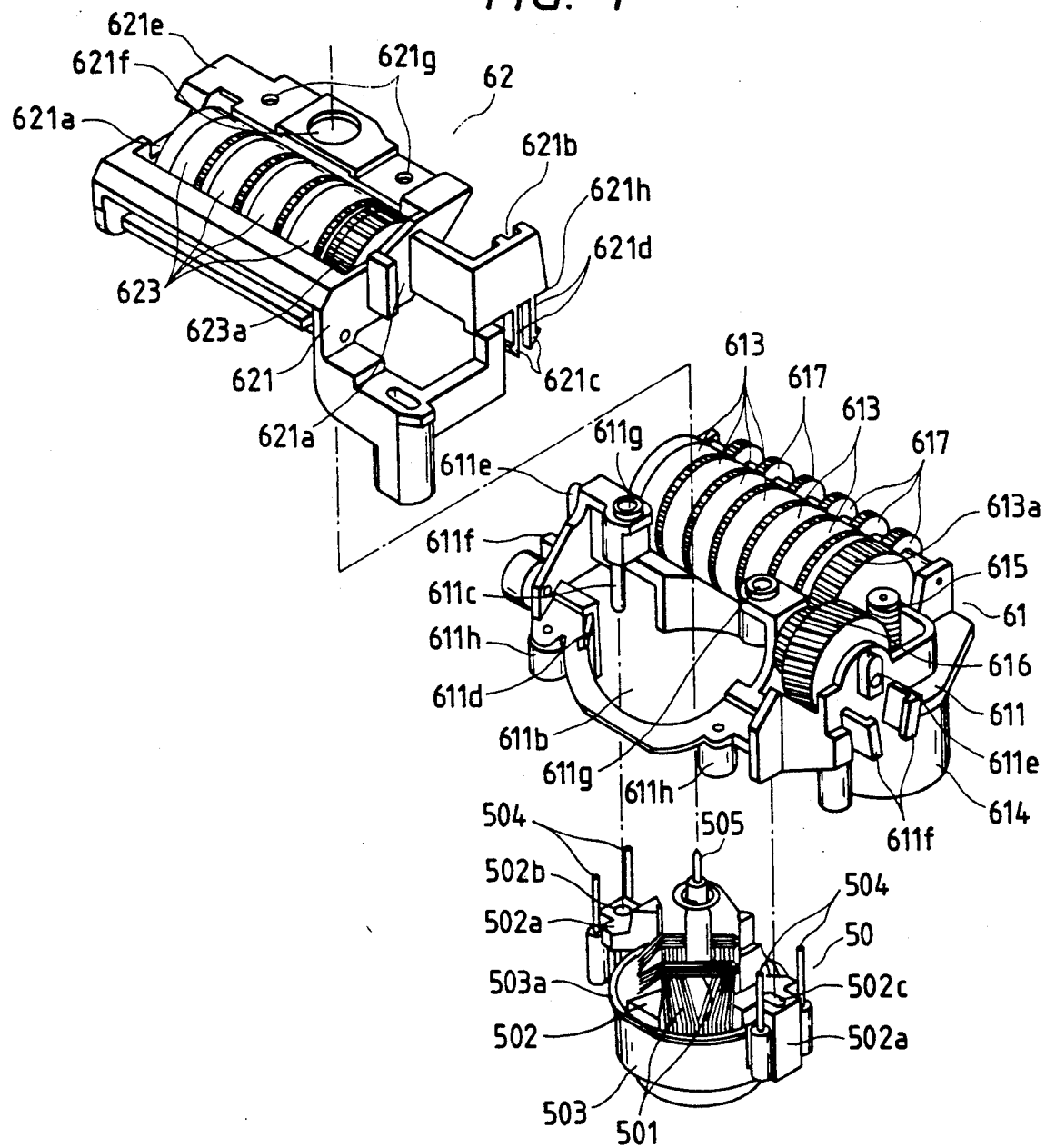
FIG. 1 is an exploded perspective view of an embodiment of an integrating distance meter for a vehicle in accordance with the present invention.
Figure 2:
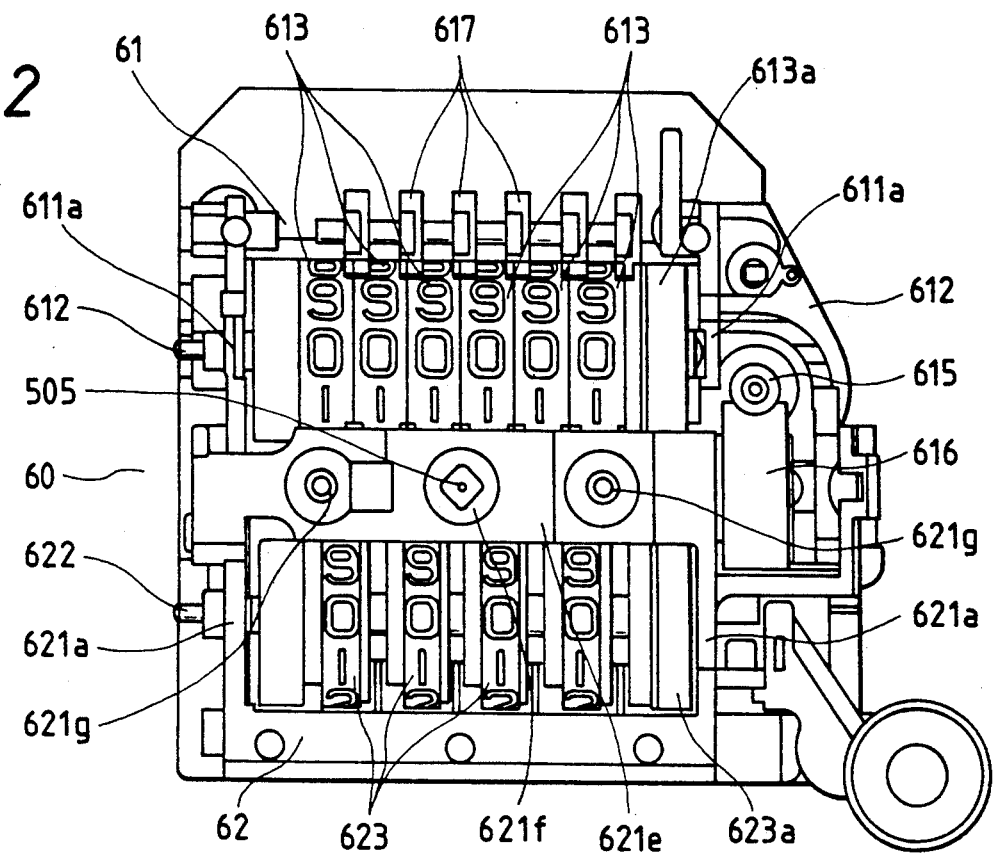
FIG. 2 is a plan view of the embodiment of the present invention.
Figure 3:
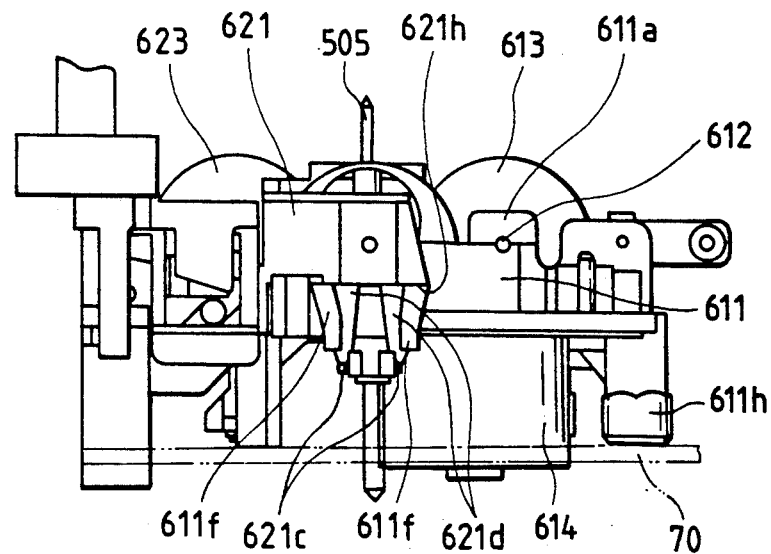
FIG. 3 is a right side-elevational view of the embodiment of the present invention.
Figure 4:
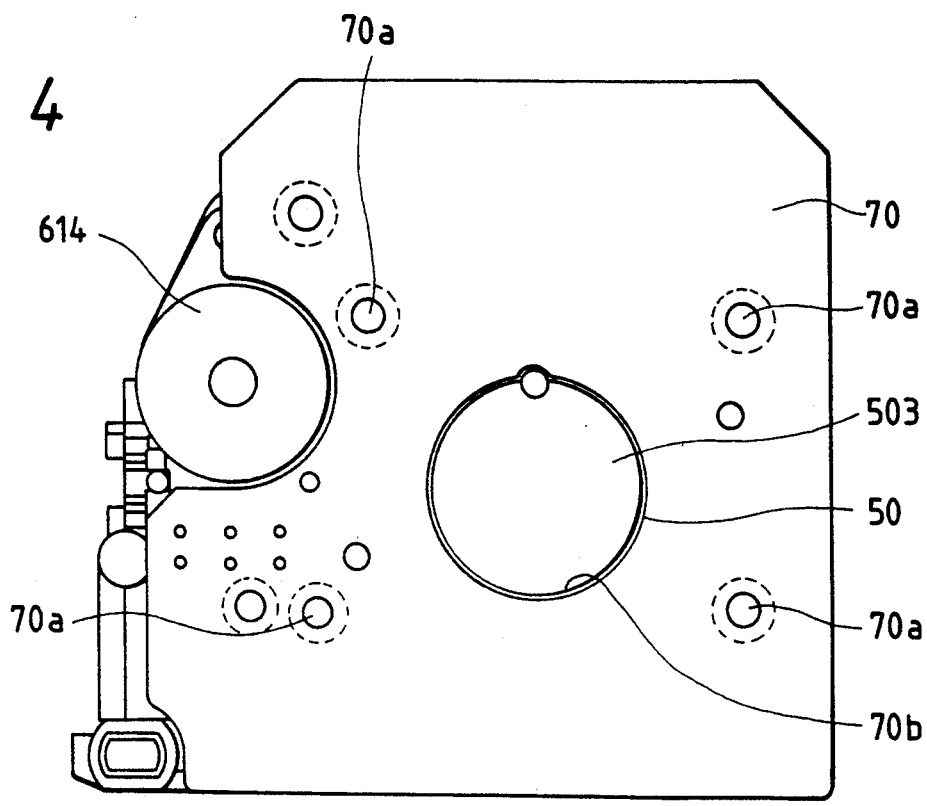
FIG. 4 is a bottom view of the embodiment of the present invention.
Figure 5:
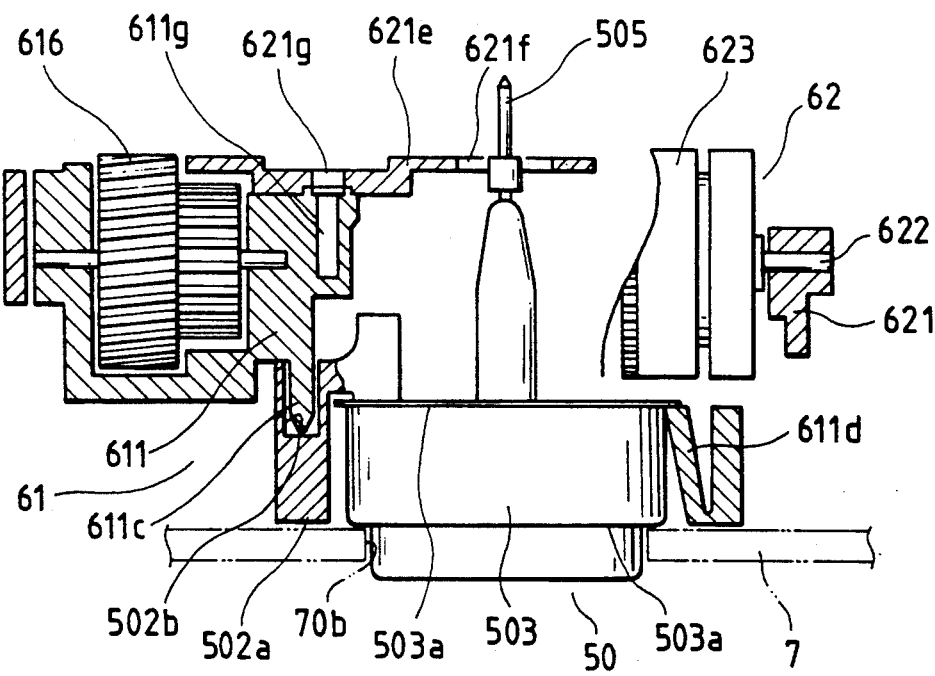
FIG. 5 is a partial cross-sectional view of the embodiment of the present invention.
Figure 6:
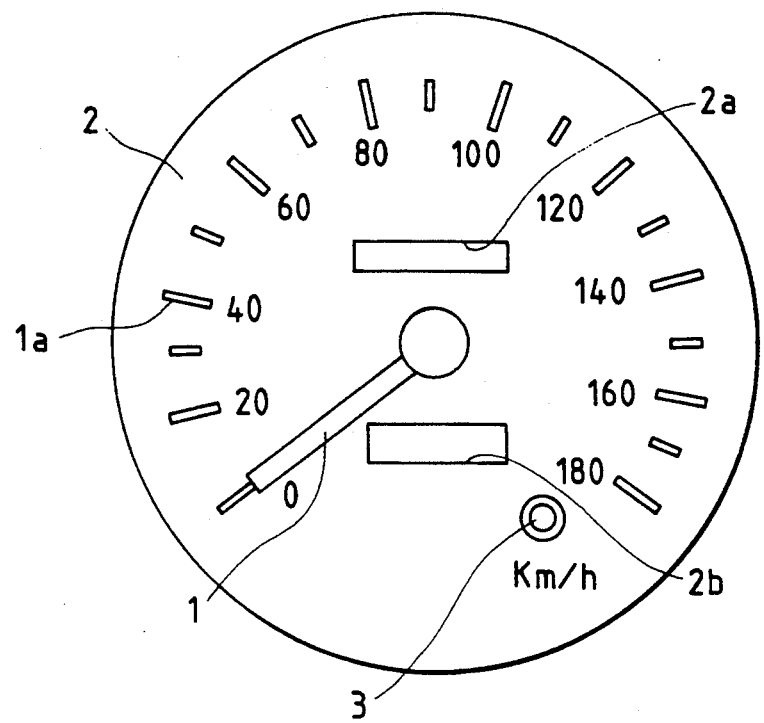
FIG. 6 is a front elevational view of a conventional integrating distance meter.
Figure 7:
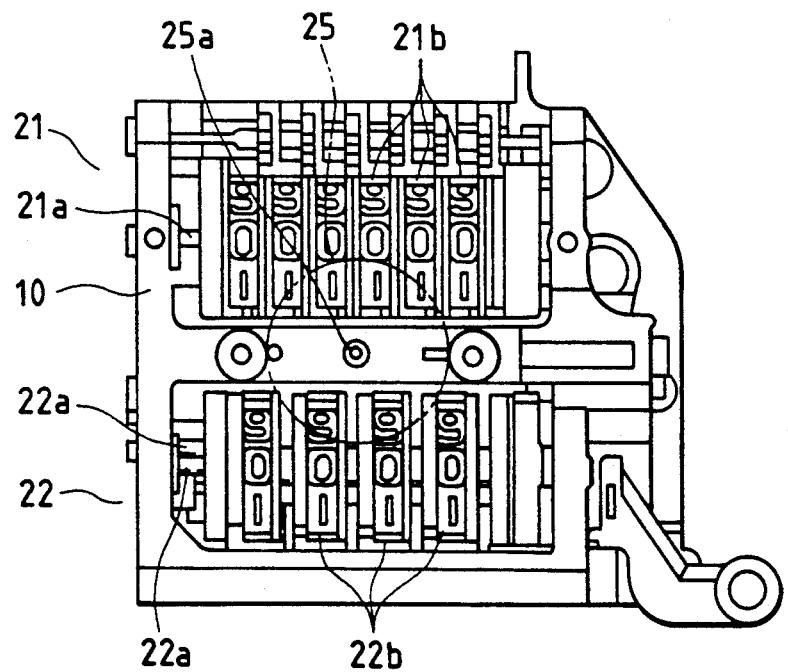
FIGS. 7, 8 and 9 are cross-sectional views illustrating an example of a conventional integrating distance meter for a vehicle.
Figure 8:
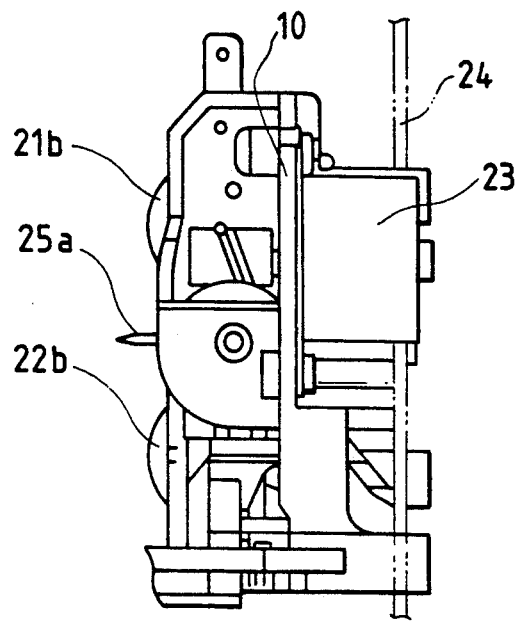
Figure 9:
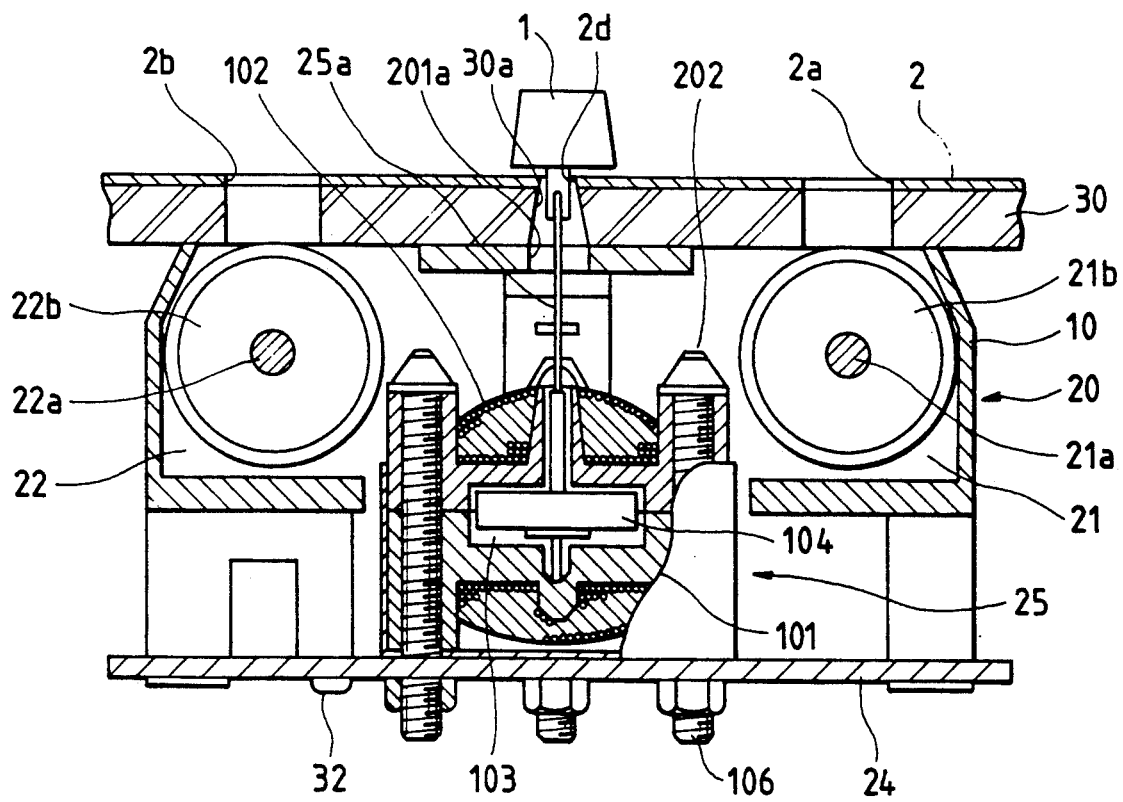

Referring now to FIGS. 1 to 5, a description will be given of an embodiment of the present invention.

FIGS. 1 to 5 illustrate an embodiment of an integrating distance meter in accordance with the present invention. In this embodiment, the integrating distance meter is shown integrated with a speedometer.

In the drawings, a cross-coil-type movement 50 for driving the pointer of the speedometer in response to a measured amount is arranged as follows. A coil bobbin 502 with a pair of coils 501 wound around its outer periphery perpendicularly to each other is accommodated in a cap-shaped shield case 503, a pair of terminal-holding portions 502a formed integrally with the coil bobbin 502 are provided on the outer side of the shield case 503 at symmetrical positions in such a manner as to project therefrom, and a pair of relay terminals 504 for supplying a drive signal to the pair of coils 501 are respectively provided on the terminal-holding portions 502a. The cap-shaped shield case 503 has the rim of its opening bent outwardly to form a flange 503a, and a round fitting hole 502b is formed in one of the terminal-holding portions 502a, while an elongated fitting hole 502c is formed in the other. It should be noted that an unillustrated pointer is fixed to a distal end a rotary shaft 505.

Meanwhile, an integrating distance meter 60 for a vehicle is arranged such that an odometer counter 61 and a trip counter 62 which are formed by using separate frames are made into a unit.

The odometer counter 61 comprises the following components: an odometer frame 611, a support shaft 612 supported on an opposing piece 611a of the odometer frame 611; a numeral wheels 613 for six digits provided rotatably on the support shaft 612; a stepping motor 614 secured to the odometer frame 611 and adapted to rotate a predetermined angle each time the vehicle travels a predetermined distance; and a transmission gear 616 which is provided rotatably on the odometer frame 611, meshes with a worm gear 615 provided on the rotating shaft of the stepping motor 614, and is adapted to transmit the rotation of the worm gear 615 to an input gear 613a formed integrally with the lowest-digit numeral wheel 613. It should be noted that reference numeral 617 denotes a pinion for carrying.

A space 611b for accommodating the aforementioned cross-coil-type movement 50 is formed in the odometer frame 611. Formed on a frame portion defining the space 611b are a pair of positioning pins 611c whose ends are pointed and which are respectively fitted in the fitting holes 502b and 502c formed in the terminal-holding portions 502a of the movement 50, and a resilient engaging piece 611d which engages with the flange 503a serving as an engaging portion formed on the shield case 503 of the movement 50 accommodated in the space 611b so as to fix movement 50 in position.

A position protrusion 611e and a pair of engaging guide portions 611f which are used for coupling and securing the trip counter 62 (which will be described below in detail) to the odometer counter 61 so as to form the two counters into a unit are formed on left and right outer wall surfaces of the odometer frame 611, respectively.

The trip counter 62 comprises a trip frame 621, a support shaft 622 supported on a pair of opposing pieces 621a of the trip frame 621, and numeral wheels 623 for four digits provided rotatably on the support shaft 622. An input gear 623a is formed integrally with the lowest-digit numeral wheel 623.

An engaging groove 621b to which the positioning protrusion 611e formed on the frame 611 of the above-described odometer counter 61 is fitted at the time of forming the trip counter 62 and the odometer counter 61 into a unit, as well as a pair of resilient engaging pieces 621d each having an engaging claw 621c for engagement with each of the pair of engaging guide portions 611f by entering between the pair of engaging guide portions 611f formed on the frame 611, are formed on the left and right inner wall surfaces of the trip frame 621, respectively.

Furthermore, a coupling plate 621e for coupling the opposing pieces 621a is formed integrally with the trip frame 621. A round hole 621f into the center of which the rotating shaft 505 of the movement 50 is inserted is formed in the coupling plate 621e. A pair of holes 621g are formed on opposite sides of the round hole 621f, and screws are respectively inserted therethrough so as to be fitted into a pair of threaded holes 611g formed in the odometer frame 611 of the odometer counter 61.

As for the odometer counter 61 and the trip counter 62 arranged as described above, if the trip frame 621 is pressed from above as viewed in the perspective view of FIG. 1 with the positioning protrusions 611e of the odometer frame 611 and the engaging grooves 621b in the trip frame 621 aligned with each other, each pair or resilient engaging pieces 621d enters between each pair of engaging guide portions 611f while undergoing deformation. Then, when a portion 621h of the trip frame 621 abuts against the upper ends of the engaging guide portions 611f, the engaging claws 621c are restored after overriding the engaging guide portions 611f, and are engaged with the lower ends of the engaging guide portions 611f.

As a result, unless the engagement of the engaging claws 621c is canceled, the frames 611 and 621 are prevented from moving relative to each other in the aforementioned pressing direction and in the opposite direction. In addition, as the outer wall surface of the odometer frame 611 on which the positioning protrusion 611e is formed is engaged with the inner wall surface of the trip frame 621 in which the engaging groove 621b is formed, the relative movement of the frames 611 and 621 in the longitudinal direction of the support shafts 612 and 622 is restricted. Furthermore, as the positioning protrusion 611e is engaged with the guide groove 621b, the relative movement of the two frames 611 and 621 in the direction perpendicular to the support shafts 612 and 622 is also restricted. The two counters 61 and 62 are thus made into a unit.

When the two counters 61 and 62 are made into a unit, the input gear 623a of the trip counter 62 meshes with the transmission gear 616 of the odometer counter 62, thereby allowing the driving force from the stepping motor 614 to be inputted to the trip counter 62.

In the integrating distance meter 60 thus formed integrally, the movement 50 is accommodated and fixed in the space 611b formed in the odometer frame, and in effecting this operation, the fitting holes 502b and 502c in the terminal-holding portions 502a of the movement 50 are aligned with the positioning pins 611, and the movement 50 is pressed from below the odometer frame 611. As a result, the movement 50 advance while deforming the resilient engaging pieces 611d by means of the flange 503a of its shield case 503, and when each terminal-holding portion 502a abut against a portion of the odometer frame 611, the flange 503a, after overriding the resilient engaging pieces 611, causes the resilient engaging pieces 611d to be restored. Thus, the flange 503a is engaged with the resilient engaging piece 611d.

As a result, unless the engagement of the resilient engaging piece 611d is canceled, the odometer frame 611 and the movement 50 are prevented from moving relative to each other in the aforementioned pressing direction and in the opposite direction. In addition, through the fitting of the positioning pins 611c to the fitting holes 502b and 502c, the positioning of the movement 50 with respect to the odometer frame 611 is effected accurately, and in this state the integrating distance meter 60 and the movement 50 are formed into a unit.

With the movement 50 accommodated and fixed in the space 611b in the odometer frame 611, a hard printed circuit board (HPC) 70 having thereon electronic components constituting a circuit for supplying a signal for driving the movement 50 and the stepping motor 614 is fitted to the odometer frame 611 from therebelow. As screws are inserted through four screw-inserting holes 70a in the HPC 70 and are screwed into threaded fittings 611h provided on the odometer frame 611, the odometer frame 611 and the HPC 70 are formed into a unit, as shown in a side elevational view in FIG. 3 and in a bottom view in FIG. 4.

In accordance with the above-described arrangement, since the support shaft 612, numeral wheels 613, stepping motor 614, transmission gear 616, HPC, and the like are assembled to the frame 611 of the odometer counter 61, the odometer counter 61 as a single unit can constitute an integrating distance meter. Also, by selecting one of various kinds of trip counter 62 and coupling the same with the odometer counter 61, it is possible to arrange an integrating distance meter having both the odometer and trip counters.

When the odometer counter 61, trip counter 62, and movement 50 are formed into a unit as described above, a dial and a light-transmitting plate (neither are shown) are superposed one above the other, and are fitted and secured over the two counters. This is effected by inserting screws into screw-inserting holes in the dial and the light-transmitting plate and into the screw-inserting holes 621g in the coupling plate 621e of the trip frame 621, and by screwing the screws into the threaded holes 611g in the odometer frame 611. As these screw are screwed in, the formation of the two frames 611 and 621 into a unit is effected firmly.

It should be noted that if the HPC 70 is secured to the odometer frame 611 as described above, the shield case 503 of the movement 50 is fitted to a hole 70b provided in the HPC 70, and the HPC 70 abuts against the stepped portion 503a of the shield case 503 and presses the same, so that the movement 50 can be held securely onto the odometer frame 611.

In addition, a resetting mechanism, though not shown, for resetting the trip counter 62 is incorporated in the trip frame 621.

By virtue of the above-described arrangement, the assembly of the movement 50 to the integrating distance meter comprising the odometer counter 61 and the trip counter 62 is effected simply by pressing the movement 50 into the space 611b formed in the odometer frame 611 of the odometer counter 61 from below the odometer frame 611. Through this assembly, the positioning pins 611c of the odometer frame 611 are fitted to the fitting holes 502b formed in the terminal-holding portions 502a, and the resilient engaging piece 611d is engaged with the flange 503a of the shield case 503, with the result that the movement 50 pressed into the space 611b is positioned and fixed at a predetermined position in the odometer frame 611. Hence, the positioning of the movement 50 with respect to the odometer frame 611 can be effected with a minimum offset.

In addition, since the HPC 70 incorporating the circuit for generating a drive signal to the movement 50 is independently fitted to the odometer frame 611 after the movement 50 is assembled to the odometer frame 611, the efficiency in assembling operation can be improved.

Furthermore, since the frames are separately provided for the odometer counter 61 and the trip counter 621, and the counters are arranged to be assembled independently, the counters can be assembled independently in advance, so that there is an advantage in terms of the management of components and the management of manufacture.

As described above, in accordance with the present invention, since the odometer counter is assembled in advance separately from the trip counter, and one of various kinds of trip counters assembled separately from the odometer counter is later selected and coupled with the odometer counter so as to obtain an integrating distance meter having both odometer and trip counters, it is possible to readily cope with the variation of the trip counters.

In addition, it is possible to provide an integrating distance meter provided only with the odometer counter separated from the trip counter, without increasing the number of kinds of products.

Also, in the combination instrument for a vehicle which combines an integrating distance meter and an analog counter for indicating a measured vehicle speed or the like by means of a pointer driven by an electrically-operated movement and the scale of a dial secured to the frame of the integrating distance meter, the arrangement provided is such that the electrically-operated movement is directly assembled and fixed to the frame of the integrating distance meter. Therefore, the positioning of the electrically-operated movement with respect to the integrating distance meter can be effected accurately, and the positional relationship between the scale of the dial fixed to the frame of the integrating distance meter and the pointer driven by the electrically-operated movement is prevented from becoming offset substantially.

Moreover, the arrangement provided is such that the positioning pins of the integrating distance meter are fitted to the fitting holes in the electrically-operated movement, and the resilient engaging piece of the integrating distance meter is engaged with the engaging portion of the electrically-operated movement, so as to allow the electrically-operated movement to be directly assembled and secured to the frame of the integrating distance meter. Accordingly, the positioning of the electrically-operated movement with respect to the integrating distance meter is effected accurately, and positional relationship between the scale of the dial fixed to the frame of the integrating distance meter and the pointer driven by the electrically-operated movement is prevented from becoming offset substantially. In addition, the efficiency in assembling operation is facilitated, thereby rendering the combination instrument for a vehicle suitable for automatic assembly.

What is claimed is:

1. A combination meter for vehicle, comprising:
   counter means, for displaying a distance traveled by said vehicle, including a frame and a plurality of numeral wheels rotatably juxtaposed to said frame, said frame having a measuring dial attached thereto which displays a measuring scale of a vehicle parameter;
   drive means for driving a pointer which, in combination with said measuring scale, indicates said vehicle parameter;
   coupling means, integral to said frame of said counter and to said drive means, for fixedly securing said frame of said counter means to said drive means;
   wherein said coupling means includes a fitting hole and an engaging portion formed in said drive means, and a positioning pin received in said fitting hole and a resilient engaging piece, for engaging said engaging portion, formed in said frame of said counter means.

2. A combination meter for vehicle as claimed in claim 1, wherein said drive means includes an electrically operated movement.

3. A combination meter for vehicle as claimed in claim 1, wherein said measured vehicle source includes a vehicle speed.

4. A combination meter for vehicle as claimed in claim 1, wherein said counter means includes an odometer.

5. A combination meter for a vehicle comprising:
   first counter means, for displaying a distance traveled by said vehicle, having a plurality of numeral wheels rotatably juxtaposed to first frame provided with said first counter means, said frame having a measuring dial attached thereto which displays a measuring scale of a vehicle parameter;
   second counter means, for displaying a distance travelled by said vehicle, having a plurality of numeral wheels rotatably juxtaposed to second frame provided with said second counter means;
   first coupling means, provided with said first counter means and said second counter means, for integrally coupling said frame of said first counter means with said frame of said second counter means;
   drive means for driving a pointer which, in combination with said measuring scale, indicates said vehicle parameter; and
   second coupling means, integral to said first counter means and said drive means, for fixedly securing said frame of said first counter means and said drive means;
   wherein said second coupling means includes a fitting hole and an engaging portion formed in said drive means, and a positioning pin received in said fitting hole and a resilient engaging piece, for engaging said engaging portion, formed in said frame of said first counter means.

6. A combination meter for vehicle as claimed in claim 5, wherein said drive means includes an electrically operated movement.

7. A combination meter for a vehicle, comprising:
   first counter means, for displaying a distance traveled by said vehicle, having a plurality of numeral wheels rotatably juxtaposed to first frame provided with said first counter means;
   second counter means for displaying a distance travelled by said vehicle, having a plurality of numeral wheels rotatably juxtaposed to second frame provided with said second counter means;
   first coupling means, provided with said first counter means and said second counter means, for integrally coupling said frame of said first counter means with said frame of said second counter means, wherein said first coupling means includes a positioning protrusion and a pair of engaging guide portions formed on left and right outer walls of said frame of said first counter means, and an engaging groove engaged with said positioning protrusion and a pair of resilient engaging pieces each having an engaging claw for engagement with each of said pair of engaging guide portions formed on left and right inner wall surfaces of said frame of said second counter means.

8. A combination meter for a vehicle, as claimed in claim 7, further comprising:

magnetic driving means, disposed on said first counter means, for driving said numeral wheels in accordance with movement of said vehicle.

9. A combination counter for vehicle as claimed in claim 8, wherein said driving means drives said numeral wheels of said second counter means.

10. A combination counter for vehicle as claimed in claim 8, wherein said driving means includes a stepping motor.

11. A combination counter for vehicle as claimed in claim 7, wherein said first counter means includes an odometer counter.

12. A combination counter for vehicle as claimed in claim 7, wherein said second counter means includes a trip counter.

* * * * *